United States Patent [19]

Rohatgi

[11] 3,932,596

[45] Jan. 13, 1976

[54] METHOD FOR SEPARATING AND RECOVERING KISH GRAPHITE FROM MIXTURES OF KISH GRAPHITE AND FUME

[75] Inventor: Pradeep Kumar Rohatgi, Bangalore, India

[73] Assignee: Bethlehem Steel Corporation, Bethlehem, Pa.

[22] Filed: Apr. 23, 1974

[21] Appl. No.: 463,349

Related U.S. Application Data

[63] Continuation-in-part of Ser. No. 271,443, July 13, 1972, abandoned.

[52] U.S. Cl. .................. 423/448; 134/25 R; 134/26; 209/9; 209/17; 423/461
[51] Int. Cl.² ..................... C01B 31/02; C01B 31/04
[58] Field of Search ........ 423/448, 461, 445; 75/30; 209/10, 12, 233, 235, 9, 17; 134/2, 3, 25 R, 26; 252/420

[56] References Cited
UNITED STATES PATENTS

| | | | |
|---|---|---|---|
| 736,381 | 8/1903 | Glogner | 423/448 |
| 780,297 | 1/1905 | Krom | 423/448 |
| 1,239,992 | 9/1917 | Weissmann | 423/448 |
| 1,328,845 | 1/1920 | Osgood | 423/448 |
| 3,348,918 | 10/1967 | Kruse | 423/446 |
| 3,349,029 | 10/1967 | Cheng | 210/21 |

OTHER PUBLICATIONS

Boux, The Canadian Mining and Metallurgical (CIM) Bulletin for Aug. 1970, pp. 921–926.
Kirk–Othmer Encyclopedia of Chemical Technology, 2nd Ed., Vol. 6, 1965, pp. 853, 856.

*Primary Examiner*—Edward J. Meros
*Attorney, Agent, or Firm*—Joseph J. O'Keefe; Charles A. Wilkinson; John S. Simitz

[57] ABSTRACT

Kish graphite can be separated from fume in kish graphite-fume mixtures and can be recovered as a clean usable product by screening the kish graphite-fume mixtures to separate the mixtures into a screen overflow and screen underflow. The screen overflow is mixed with a solution of a washing agent and a surface active agent. The mixture is stirred to thoroughly "wet" the surfaces of the kish graphite. The mixture is filtered. The kish graphite is recovered as a filter cake. The effluent which consists of the washing agent, the surface active agent and fume, is passed to waste. The kish graphite retains its integrity through the separation, recovery, and cleaning steps.

22 Claims, 4 Drawing Figures

METHOD FOR SEPARATING AND RECOVERING KISH GRAPHITE FROM MIXTURES OF KISH GRAPHITE AND FUME

CROSS-REFERENCE TO RELATED APPLICATION

This is a continuation-in-part application of my original application Ser. No. 271,443 filed July 13, 1972 entitled "Method for Separating and Recovering Kish Graphite from Mixtures of Kish Graphite and Fume", now abandoned.

BACKGROUND OF THE INVENTION

This invention is directed to a method for separating kish graphite from fume in kish graphite-fume mixtures and recovering the kish graphite as a clean usable product.

Kish graphite is defined as single crystals of flake graphite which precipitate from super saturated solutions of carbon in iron as the molten iron cools during tapping, pouring, teeming or other operations during production of iron and steel. Kish graphite is formed, for example, when iron which is tapped from a blast furnace cools while flowing in a network of runners on a cast house floor to submarine ladles. Kish graphite also forms when iron is transferred from submarine ladles to a holding mixer or ladle in reladling stations where the iron is stored prior to its use as a charge material for steel producing furnaces. The kish graphite forms on or floats to the surface of the molten iron and is emitted from the hot surface in the form of fine particles. Kish graphite is very light in weight, hence the kish graphite is carried into the atmosphere by heat convection from the surface of the molten iron.

Another product of the aforementioned operations is "fume". Fume is released from the molten metal at the same time as the kish graphite. Fume consists of relatively fine particles of iron oxides, silica, alumina, zinc oxide, manganese oxides, lime, magnesia and the like. Since kish graphite and fume are released from the molten metal at the same time, mixtures of kish graphite and fume are formed. The formation of large quantities of kish graphite-fume mixtures causes serious storage and disposal problems in steel plants. It is recognized that both kish graphite and fume are valuable commodities in themselves. Kish graphite can be used in the production of carbon electrodes, carbon electrical brushes, graphite crucibles and the like. However, the kish graphite must be relatively pure, that is, free from contaminating materials. Fume can be used as charge material to metallurgical furnaces, such as blast furnaces, wherein the iron oxides can be reduced to metallic iron. The fume must be balled, that is, formed into roughly spheroidal-like particles of a desired size or sintered prior to use in the metallurgical furnaces. The presence of large quantities of kish graphite in the mixtures makes kish graphite-fume mixtures unsuitable for balling. There is, therefore, a need for a method of separating kish graphite from fume in kish graphite-fume mixtures and recovering kish graphite which is substantially free from fume and which kish graphite retains its original size. Prior art methods to separate kish graphite from fume, include one method described in U.S. Pat. No. 1,239,992 issued Sept. 11, 1917 to Frederick W. Weissmann in which graphitic carbon is separated from iron and iron oxides and silica. In order to rid the graphite flakes of iron and silica, the mixture is reduced to powder and graphitic carbon separated from the iron and silica by levitation. The comminuted graphitic carbon is chemically refined by boiling with sulfuric and nitric acids or hydrochloric and hydrofluoric acids. While a clean kish graphite may be obtained by this method, the kish graphite loses its original size and shape during comminution.

It is therefore the object of this invention to provide a method for separating, cleaning and recovering kish graphite from mixtures containing kish graphite and fume.

It is another object of this invention to provide a method for separating kish graphite from fume in kish graphite-fume mixtures and recovering cleaned kish graphite wherein the kish graphite is washed in a solution of a washing agent and a non-ionic or cationic surface active agent and the kish graphite is separated and recovered as filter cake by filtering the mixture of kish graphite, washing agent and surface active agent.

SUMMARY OF THE INVENTION

Broadly, the method of the invention includes screening mixtures of kish graphite and fume on a 50 mesh size screen to separate kish graphite as a screen overflow from fume as a screen underflow. The screen overflow is mixed with a washing agent containing a surface active agent. The mixture of kish graphite and washing agent and surface active agent is agitated to "wet" the surfaces of the kish graphite. The mixture is filtered on a 50 mesh screen. Clean kish graphite is recovered as a filter cake and the solution of washing agent and surface active agent containing fume is discarded as an effluent.

PREFERRED EMBODIMENT OF THE INVENTION

Kish graphite can be separated from fume in kish graphite-fume mixtures which are collected in steel plants and the like. The kish graphite can be treated and recovered as a clean usuable product. Kish graphite, which has previously been defined as single crystals of flake graphite, is relatively coarse in size. Most of the kish graphite is +100 mesh sieve size and is between 0.5–5mm. wide and 5–10 microns in thickness. Fume on the other hand, is relatively fine in size, about −400 mesh sieve size, and generally less than 5 microns. Kish graphite is generally hexagonal in shape and "growth-steps" are visible on the crystals. Fume is generally globular in shape.

A rough separation of kish graphite from fume in kish graphite and fume mixtures can be made by screening on a 50 mesh sieve. The screen overflow, that is, particles which are +50 mesh size, contains substantially all the kish graphite and the screen underflow, that is, particles which are −50 mesh size, contains substantially all the fume.

Figure 1:
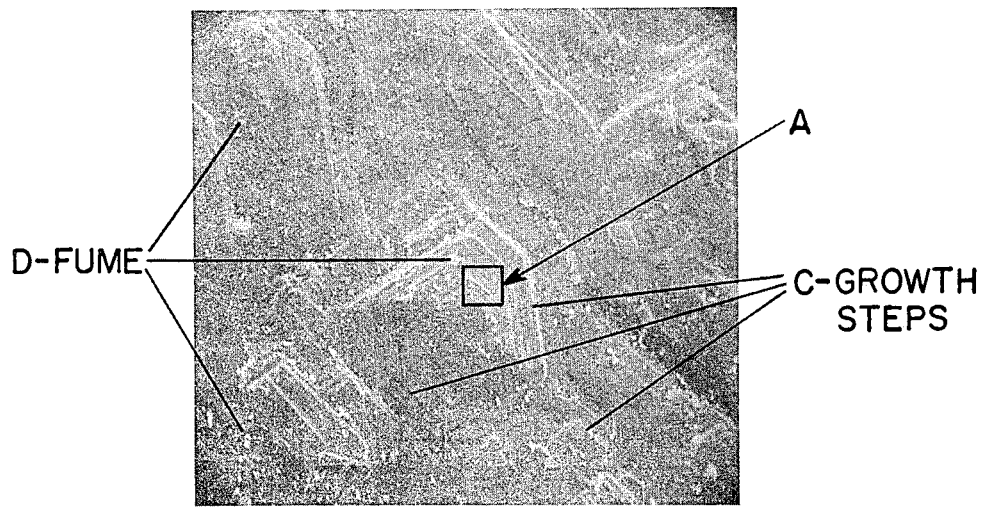
FIG. 1 is a reproduction of a photomicrograph of kish graphite in a screen overflow after a kish graphite-fume mixture has been screened, taken at a magnificatin in 200 diameters on a scanning electron microscope.
Figure 2:
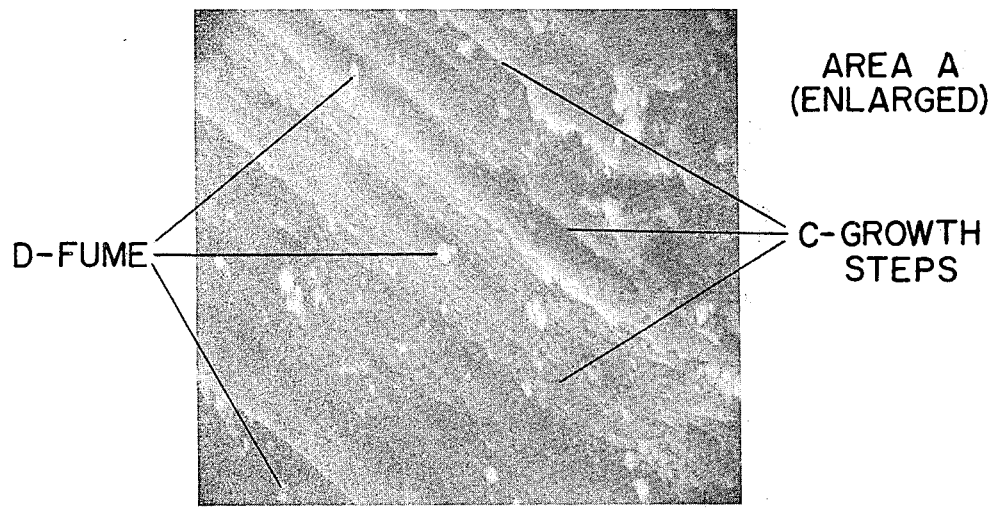
FIG. 2 is a reproduction of a photomicrograph of an area identified as A in FIG. 1, taken at a magnification of 2000 diameters.

Turning now to the Figures, FIG. 1 is a reproduction of a photomicrograph of kish graphite found in the screen overflow, taken at a magnification of 200 diameters on a scanning electron microscope. It can be seen that kish graphite is generally hexagonal in shape and exhibits growth steps C on the surfaces of the kish graphite. Numerous, relatively fine globular-like particles of fume D adhere to the surfaces of the kish graphite particularly in the growth-steps C. Turning now to FIG. 2, which is a reproduction of a photomicrograph of the area A of the kish graphite of FIG. 1 taken at a magnification of 2000 diameters on a scanning electron microscope, the fume D can be seen to be entrapped in the growth-steps C of the kish graphite. The entrapped fume is difficult to remove from the surfaces of the kish graphite.

Of course, some fume will be contained in the screen overflow and some kish graphite will be contained in the screen underflow. The amount in each case will be minimal. Substantially all the fume in the screen overflow adheres to the surface of the kish graphite. The fume can become entrapped in the angular growth steps formed on the surfaces of the kish graphite. The fume contaminates the kish graphite and makes the kish graphite undesirable for many applications, such as for example, forming carbon electrodes, graphite crucibles and the like. It is desirable to remove the fume from surfaces of the kish graphite while maintaining the integrity, that is, the original size and crystallinity of the kish graphite to produce a clean usable product. The fume adhering to the flat surfaces of the kish graphite is relatively easily removed, but the fume trapped in the growth-steps is not easily removed. I have found that a portion of the fume can be removed from the surfaces of the kish graphite while maintaining the integrity of the kish graphite, by immersing the kish graphite in a washing agent, such as water, or water solutions of hydrochloric acid, waste hydrochloric acid pickle liquor and the like.

The screen overflow is charged into a vessel containing one of the above mentioned washing agents. The mixture so formed is agitated or stirred for a time to thoroughly "wet" the surfaces of the kish graphite. It is difficult to "wet" the surfaces of the kish graphite with a washing agent, such as water, and water solutions of hydrochloric acid, waste hydrochloric acid pickle liquor and the like and mixtures thereof. As a result, only partial cleaning of the kish graphite is accomplished if only these agents are used. After washing, the mixture is filtered to separate the kish graphite and washing agent and fume. The kish graphite is recovered as a filter cake and the washing agent and fume are passed to waste as the effluent. It has been found that agitation of the mixture of kish graphite and washing agent for as little as 15 minutes can achieve some results in removing fume from the surfaces of the kish graphite, but it is preferred to agitate the mixture between about 30 minutes to about one hour for best results. Any time longer than one hour does not enhance the removal of the fume. The mixture is filtered on a filter press using 50 mesh size screens to thereby interrupt the flow of kish graphite through the filter press but to allow the fume and washing agent to pass through the filter press. Substantially all the kish graphite which is +50 mesh size is recovered as filter cake. The results of washing kish graphite in several washing agents is shown in Table I:

Table I

Effect of Washing a Screened Mixture of Kish Graphite and Fume in a Washing Agent

| | Chemical Analysis of Mixture in Percent | | | | | | |
|---|---|---|---|---|---|---|---|
| | C* | Fe (as Fe Oxides) | $SiO_2$ | S | P | Ca (as CaO) | Mn (as MnO) |
| Typical as Collected | 11.2 | 60.4 | 1.06 | 0.057 | 0.048 | 0.40 | 0.50 |
| As Screened (+50 mesh) | 46.6 | 34.2 | 2.04 | — | — | 0.4 | — |
| Water | 49.8 | — | — | — | — | — | — |
| 50% HCL | 66.0 | — | — | — | — | — | — |
| Waste HCL Pickle Liquor | 49.1 | — | — | — | — | — | — |

*Note that in all cases the carbon content of as-screened +50 mesh kish graphite has increased, indicating each of the washing agents is effective in removing some fume from the surfaces of the kish graphite.

The above listed washing agents are effective in removing a portion of the fume adhering to the surfaces of the kish graphite as evidenced by the increase in carbon content. The integrity, that is, the original size and crystallinity of the kish graphite as-received and screened, is maintained through the separation, cleaning and recovering steps. However, the kish graphite is still "dirty" and cannot be used in many applications, such as manufacture of carbon electrodes. I have found that a substantial portion, if not all, of the fume adhering to the surfaces of the kish graphite and trapped in the growth steps of the kish graphite, can be removed by adding a desired amount of a surface active agent to the washing agents listed above, prior to agitation of the mixture of kish graphite and the washing agent. The addition of a surface active agent does not affect the integrity of the kish graphite and the cleaned kish graphite is essentially the same in size as the as-received kish graphite before screening. The surface active agents which can be used to increase the "wetting" characteristics of the washing agent are soluble in water and have a carbon chain of between $C_{10}$ and $C_{18}$ with a carbon chain of about $C_{11}$ to $C_{15}$ preferred. Increasing the "wetting" characteristics of the washing agent increases the efficiency of removing fume from all the surfaces of the kish graphite. The surface active agents which can be used can be non-ionic, cationic or anionic.

Anionic surfactants are compounds which contain hydrophilic and lipophilic groups in their molecular structure and which ionize in an aqueous medium to give anions containing the lipophilic group. Typically these compounds are alkali metal, ammonium or organic amine salts of fatty acids, organic sulfonates, or phosphate or sulfate esters. Anionic type surface active agents, for example, sodium lauryl sulphate, and potassium oleate and the like react with metallic impurities in the fume and must be added in excess of impurities present before they contribute to the washing efficiency. The large amount of interfering fume constituents present make it impractical to use anionic wetting agents without the addition of water softening agents.

Cationic surface active agents such as Quaternary ammonium compounds, for example, cetyl trimethyl ammonium bromide sold by Fairfield Labs under the tradename "Cetab" and the like, are not adversely affected by fume and do effectively increase the washing characteristics of the washing agent.

The non-ionic type of surface active agent was found to be most effective of all and greatly improved the washing characteristics of the washing agent.

The non-ionic types of surface active agents useful in the method of the invention are Alkanolamides which have a carbon chain of about $C_{10}$ to about $C_{18}$ and are produced by condensing diethanolamine with a fatty acid, such as lauric, myristic, capric, myristoleic, palmitoleic, oleic and coconut acids in a mol ratio of 2:1 or decylic acid in a mol ratio of 1:1. A method for the production of this type of surface active agent is described in U.S. Pat. No. 2,538,929 issued January 23, 1951 to George Zinzalian and entitled "Polyalkanolamine condensed with Fatty Acid Mixture". It is preferred to use the alkanolamides made by the condensation of diethanolamine with lauric acid or coconut acids in a ratio of 2 mols of diethanolamine to one mol of lauric acid or coconut acids. Examples of this class of non-ionic compounds, which were found to greatly improve washing efficiency are Polycomplex A-11, produced by Ocean Wide Industries, Inc., and Infrasan-C, produced by Reilly-Whitman, Inc.

Alkanolamides which are water dispersible but are not water soluble do not increase the "wetting" characteristics of water and hence do not increase the efficiency of the washing agent in removing fume from the surfaces of the kish graphite.

Another important class of non-ionic surfactants is formed by the addition of ethylene oxide to hydrophobes such as fatty acids, long chain alcohols, mercaptans and alkyl phenols. An example of a polyoxyethylene glycol ether of a linear alcohol which also has given good results in the method of the invention is Tergitol 15-S-9. Other suitable members of this series are Tergitol 15-S-7, Tergitol 15-S-12 and Tergitol 15-S-15. This series of surfactants has a carbon chain length between 11 and 15. The final suffixes 7, 9, 12, 15 in each case identify the number of moles of ethylene oxide reacted with the linear alcohol.

As noted previously, the addition of a surface active agent to the washing agent increases the efficiency of the washing agent in removing fume from kish graphite. An anionic surfactant does achieve some results of the invention; however, the improvement in removing the fume is so slight that it is not economically feasible to use an anionic surfactant. Cationic and non-ionic surfactants, on the other hand, significantly improve the wetting characteristics of the washing agent. The amount of surface active agent added to the washing agent can range from 20 parts per million to about 50,000 parts per million, depending upon the washing agent and the surface active agent added thereto. Larger amounts of the surface active agent than noted above can be used but since the improvement in efficiency of the washing agent is negligible, it is not economically feasible to use larger amounts.

A wide variety of surface active agents which are soluble in the washing agents can be employed to obtain the results of the invention. Since there are so many surface active agents which can be employed in the invention, it would be voluminous to list them all. Therefore, only the general types of surface active agents which can be used are presented above and preferred types will be illustrated in specific examples.

This aspect of the invention resides in the use of a suitable surface active agent per se and individual compositions are important only so far as their properties affect this function. From the description herein, one skilled in the art will know or deduce the surface active agent suitable for use in the meethod of the invention. Some surface active agents are, however, preferred, as will appear from the appended claims.

A simple test to evaluate the surface active agents which are useful in the invention is as follows: a screened sample containing kish graphite and adhering fume is placed in a beaker containing water as the washing agent. After stirring the mixture, the kish graphite is allowed to settle or float. Generally a substantial portion of the kish graphite is not "wetted" by the water and remains floating on the surface of the water despite its greater density with respect to water and the heavy fume adhering to its surface. A few drops, about 5000 parts per million, of a surface active agent are added to the mixture. An observation is made as to whether most of the particles of kish graphite, with fume adhering thereto, (which particles were floating before the addition of the surface active agent) sink as a result of the addition of the surface active agent to the water. If most of the kish graphite with fume adhering to its surfaces sinks in the water as a result of the addition of a surface active agent, then that surface active agent is considered likely to be satisfactory to be used in the method of the invention. This qualitative test was confirmed by actual cleaning experiments using different surface active agents as described in the following examples:

EXAMPLE NO. 1

A sample containing kish graphite and fume was collected in a baghouse at a reladling station between iron containing submarines and basic oxygen furnaces, the sample was screened on a 50 mesh sieve. The sample had a carbon content of 11.2% before screening. The screen overflow, +50 mesh size fraction had the following chemical analysis:

| | |
|---|---|
| Carbon | 46.6% |
| Iron Oxide as Iron | 34.2% |
| Silica | 2.4% |
| Lime | 0.4% |

The screen overflow was divided into five equal portions of 25 grams each. Each portion was throughly mixed with one of the following washing agents:
1. water
2. water and 5% polycomplex A-11 (non-ionic)
3. water and 5% Tergitol 15-S-9 (non-ionic)
4. water and 5% Cetab (cationic)
5. water and 5% potassium oleate (anionic)

The mixtures so formed were heated to a temperature of 175° F. and were stirred four times at intervals of 10 minutes. The mixtures were screened on a 50 mesh sieve to separate and recover the kish graphite as a filter cake. The washing agent and fume were passed to waste. The filter cake so collected was washed with distilled water and dried. The carbon content of the kish graphite was as follows:

| Test No. | Carbon |
|---|---|
| Sample 1 | 49.8% |
| Sample 2 | 61.1% |
| Sample 3 | 55.3% |
| Sample 4 | 58.0% |
| Sample 5 | 52.3% |

From the above, it is evident that a series of surface active agents when added to water improve the "wetting" characteristics of the water and thereby the efficiency of the water in removing fume from the surfaces of kish graphite. The non-ionic and cationic surface active agents are superior to the anionic surface active agents in improving the cleaning efficiency of water.

EXAMPLE NO. 2

A mixture of kish graphite and fume having a carbon content of 11.2% was screened on a 50 mesh sieve. The screen overflow, +50 fraction, had a chemical analysis as follows:

| Carbon | 46.6% |
|---|---|
| Iron Oxide as Iron | 34.2% |
| Silica | 2.4% |
| Lime | 0.4% |

The screen overflow was divided into five equal portions of 400 grams each. Each portion was mixed with 2000 cc of the following washing agents:
1. water
2. water + 5% Infrasan-C (non-ionic)
3. water + 5% Tergitol 15-S-9 (non-ionic)
4. water + 5% Cetab (cationic)
5. water + 5% sodium oleate (anionic)

The mixtures were heated to 155°0F. The mixtures were stirred with a mechanical agitator at 3600 revolutions per minute for 20 minutes. The mixtures were then filtered through a 50 mesh sieve to separate the kish graphite from the washing agents and fume. The kish graphite was rinsed eight times in water with stirring. The kish graphite was then dried. The carbon content of the dried kish graphite follows:

| Test No. | Carbon |
|---|---|
| 1 | 84.3% |
| 2 | 88.0% |
| 3 | 88.8% |
| 4 | 86.3% |
| 5 | 84.2% |

It is evident that using several washing steps and intensified stirring removes more fume than one washing. It is also evident that the addition of a small portion of a surface active agent improves the efficiency of water as a washing agent. The non-ionic and cationic surface active agents are superior to the anionic surface active agents.

EXAMPLE NO. 3

A mixture of kish graphite and fume having a carbon content of 11.2% was screened on a 50 mesh sieve. The screen overflow, +50 mesh sieve fraction was divided into two equal portions of 150 grams. One portion was mixed with 800 cc of water and the other portion was mixed with 760 cc of water and 40 cc of Polycomplex A-11 a non-ionic surface active agent of the alkanolamide-type. The mixtures were heated to 175° F. and stirred for 45 minutes. The mixtures were filtered on a 50 mesh sieve. The filter cakes, which consisted of kish graphite, were washed with 5000 cc of water and dried at 230° F. for 3 hours. The washing and drying steps were repeated four times. The results of the tests are listed below:

| | % Carbon | Chemical Analysis % Iron Oxide As Iron | % SiO$_2$ |
|---|---|---|---|
| Screen overflow as screened | 46.6 | 34.2 | 2.4 |
| 1st wash-water | 83.9 | | |
| 2nd wash-water | 84.0 | | |
| 3rd wash-water | 85.4 | | |
| 4th wash-water | 86.3 | 8.2 | 1.6 |
| 1st wash-water + polycomplex A-11 | 84.6 | | |
| 2nd wash-water + polycomplex A-11 | 84.6 | | |
| 3rd wash-water + polycomplex A-11 | 88.9 | | |
| 4th wash-water + polycomplex A-11 | 89.8 | 5.8 | 1.2 |

It is obvious that water can be used to separate kish graphite from fume, and repeated washings improve the purity of the kish graphite. It is also evident that the addition of a surface active agent to the water improves the ability of the water to clean the kish graphite.

EXAMPLE NO. 4

The experiment of Example No. 1 was repeated using hydrochloric acid as a washing agent. Two surface active agents, polycomplex A-11 and Tergitol P-28, were added to the HCl to form washing agents. The results of the washing tests follow:

| Solution | Carbon Content of Kish |
|---|---|
| 50% HCl in water | 66.0% |
| 50% HCl in water and 5% Polycomplex A-11 | 69.0% |
| 50% HCl in water and 5% Tergitol P-28 | 67.0% |

As noted previously, the 50% HCl in water solution cleaned the kish graphite. However, additions of a surface active agent did enhance the ability of the washing agent to remove fume from kish graphite.

EXAMPLE NO. 5

A mixture of kish graphite and fume from the bag house of a basic oxygen furnace reladling station was screened to obtain a screen overflow, +50 mesh fraction, a −50, +70 mesh fraction and a −70 mesh fraction. Four portions of the screen overflow, +50 fraction were tested by mixing one portion with 800 cc of a washing agent — 50% HCl-50% H$_2$O to which 2.2 cc of the surface active agent Polycomplex A-11 was added. The particles of kish graphite floated in the 50% HCl-50% H$_2$O solution but sank in the solution when 2.2 cc of Polycomplex A-11 were added. The mixture was agitated while being heated to 175° F. and held for 45 minutes. The mixture was filtered on a 50 mesh sieve. The filter cake, which consisted primarily of kish graphite, was washed with water and was dried at 230°

F. for three hours. The filter cake was washed from one to four times with 50% HCl-50% water-0.25% Polycomplex A-11 solution. The results of the tests follow:

| | C (%) | Fe (%) | Chemical Analysis SiO$_2$ (%) | S (%) | P (%) | Ca (%) | Mn (%) |
|---|---|---|---|---|---|---|---|
| As collected mixture | 11.2 | 62.1 | | | | | |
| Screened on a 50 mesh sieve size | 46.6 | 34.2 | 2.4 | 0.9 | .03 | .33 | .07 |
| After 1st wash in solution | 93.5 | 1.2 | 3.4 | .03 | .01 | .07 | .011 |
| After 2nd wash in solution | 95.6 | .44 | 2.9 | .03 | .01 | .07 | .008 |
| After 3rd wash in solution | 96.2 | .65 | 2.6 | .03 | .01 | .06 | .012 |
| After 4th wash in solution | 97.4 | .15 | 2.1 | .04 | .01 | .05 | .007 |

It can be seen that the kish graphite can be purified to about 97% to 98% carbon by repeated washings with an HCl-H$_2$O solution to which a surface active agent has been added.

Figure 3:
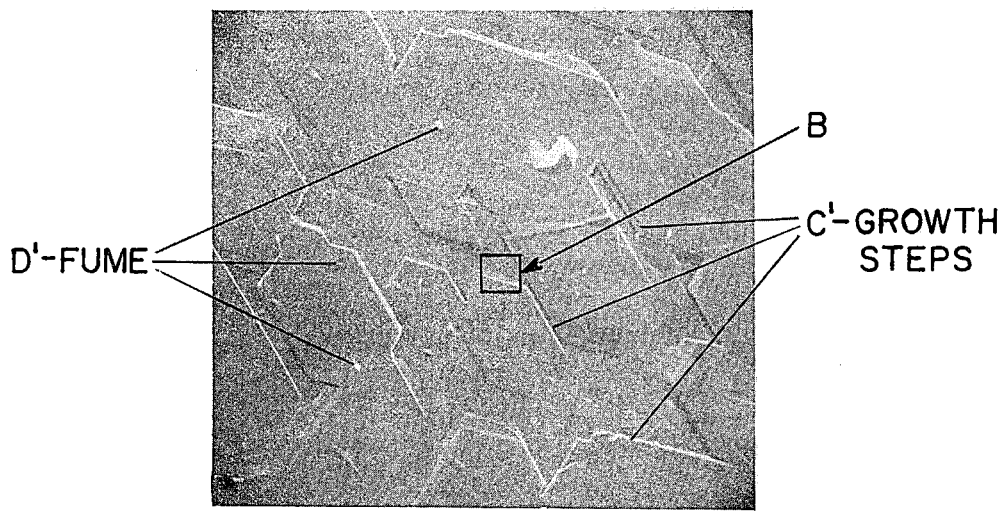
FIG. 3 is a reproduction of a photomicrograph of the kish graphite shown in FIG. 1, after treatment by the method of the invention, taken at a magnification of 200 diameters.

FIG. 3 is a reproduction of a photomicrograph of kish graphite taken at a magnification of 200 diameters on a scanning electron microscope after being cleaned as described in Example No. 5 above. There are only a few small particles of fume D' which remain on the surface of the kish graphite after cleaning.

Figure 4:
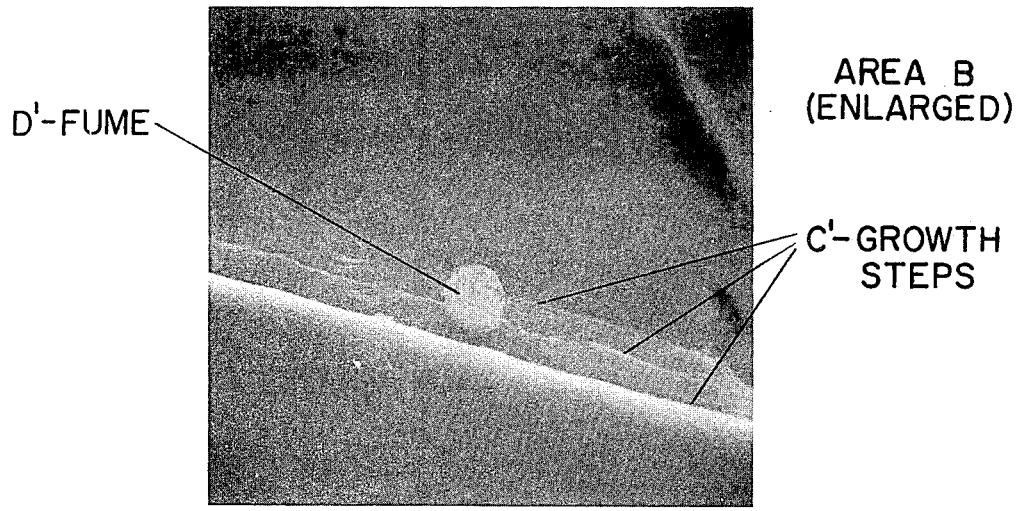
FIG. 4 is a reproduction of a photomicrograph of an area identified as B in FIG. 3, taken at a magnification of 2000 diameters.

FIG. 4 is a reproduction of a photomicrograph of the small area B, in FIG. 3, taken at a magnification of 2000 diameters on a scanning electron microscope, showing a particle of fume D' adhering to the kish graphite in a growth step C' of the kish graphite.

EXAMPLE NO. 6

A mixture of kish graphite and fume was screened on a 50 mesh sieve to obtain a screen overflow, +50 mesh fraction, and a screen underflow −50 mesh fraction. The screen overflow had the following chemical analysis:

| Carbon | 46.6% |
|---|---|
| Iron Oxide as Iron | 34.2% |
| Silica | 2.4% |
| Lime | 0.4% |

The screen overflow was divided into two equal portions. One portion was mixed with waste hydrochloric acid pickle liquor. The other portion was mixed with a waste hydrochloric acid +5% Polycomplex A-11 solution. The mixtures were heated to about 175° F. for 45 minutes and were stirred at 10-minute intervals. The mixtures were filtered on a 50 mesh sieve. The filter cakes, substantially all particles of kish graphite, were washed with water and were dried. The carbon content of the kish graphite was as follows:

| Washing Solution | Carbon (%) |
|---|---|
| Waste hydrochloric acid pickle liquor | 49.1 |
| Waste hydrochloric acid pickle liquor +5% Polycomplex A-11 | 51.7 |

This example demonstrates that the ability of waste hydrochloric acid pickle liquor to clean kish graphite is improved by addition of a non-ionic surface active agent.

I claim:

1. An improved method for separating kish graphite from kish graphite and fume mixtures and recovering the kish graphite as a clean product comprising:

a. screening the kish graphite and fume mixture to obtain a screen overflow consisting essentially of kish graphite with fume adhering to the surfaces thereof and a screen underflow consisting essentially of fume, said screen underflow being passed to waste, b. mixing the screen overflow with at least one washing agent taken from the group consisting of water, hydrochloric acid and waste hydrochloric acid pickle liquor, c. adding a quantity of at least one surface active agent taken from the group consisting of a water soluble non-ionic compound and a water soluble cationic compound, where said water soluble non-ionic compound is the condensation product of the reaction between two mols of diethanolamine and one mol of at least one fatty acid taken from the group consisting of lauric acid, myristic acid, myristoleic acid, palmitoleic acid, oleic acid and coconut acids and a compound formed by the addition of ethylene oxide to a linear alcohol having a carbon chain length of about $C_{11}$ to about $C_{15}$ and said water soluble cationic compound is a quaternary ammonium salt, to the mix of step (b), d. agitating the mixture formed in step (c) for a time to substantially completely wet the surfaces of the kish graphite, e. filtering the agitated mixture of step (d) to separate the kish graphite from the fume washing agent and surface active agent, said kish graphite being collected as a filter cake and the fume, washing agent and surface active agent as an effluent which is passed to waste, f. washing and drying the kish graphite recovered in step (e) as filter cake.

2. The method of claim 1 wherein the washing agent of step (b) is water.

3. The method of claim 1 wherein the washing agent of step (b) is hydrochloric acid.

4. The method of claim 1 wherein the washing agent of step (b) is waste hydrochloric acid pickle liquor.

5. The method of claim 1 wherein the washing agent of step (b) is a 50%-50% mixture of hydrochloric acid and water.

6. The method of claim 2 wherein the surface active agent added to the mixture of step (b) in step (c) is a non-ionic compound which is a condensation product of the reaction between two mols of diethanolamine with one mol of lauric acid.

7. The method of claim 2 wherein the surface active agent added to the mixture of step (b) in step (c) is a condensation product of the reaction between two mols of diethanolamine with one mol of coconut acid.

8. The method of claim 2 wherein the surface active agent added to the mixture of step (b) in step (c) is a non-ionic compound formed by the addition of ethylene oxide to a linear alcohol having a carbon chain length of about $C_{11}$ to about $C_{15}$.

9. The method of claim 2 wherein the surface active agent added to the mixture of step (b) in step (c) is a quaternary ammonium salt.

10. The method of claim 3 wherein the surface active agent added to the mixture of step (b) in step (c) is a condensation product of the reaction between two mols of diethanolamine and one mol of lauric acid.

11. The method of claim 3 wherein the surface active agent added to the mixture of step (b) in step (c) is a condensation product of the reaction between two mols of diethanolamine and one mol of coconut acid.

12. The method of claim 3 wherein the surface active agent added to the mixture of step (b) in step (c) is a non-ionic compound formed by the addition of ethylene oxide to a linear alcohol having a carbon chain length of about $C_{11}$ to about $C_{15}$.

13. The method of claim 3 wherein the surface active agent added to the mixture of step (b) in step (c) is a quaternary ammonium salt.

14. The method of claim 4 wherein the surface active agent added to the mixture of step (b) in step (c) is a quaternary ammonium salt.

15. The method of claim 4 wherein the surface active agent added to the mixture of step (b) in step (c) is a condensation product of the reaction between two mols of diethanolamine and one mol of lauric acid.

16. The method of claim 4 wherein the surface active agent added to the mixture of step (b) in step (c) is a condensation product of the reaction between two mols of diethanolamine and one mol of coconut acid.

17. The method of claim 4 wherein the surface active agent added to the mixture of step (b) in step (c) is a non-ionic compound formed by the addition of ethylene oxide to a linear alcohol having a carbon chain length of about $C_{11}$ to about $C_{15}$.

18. The method of claim 5 wherein the surface active agent added to the mixture of step (b) in step (c) is a condensation product of the reaction between two mols of diethanolamine and one mol of lauric acid.

19. The method of claim 5 wherein the surface active agent added to the mixture of step (b) in step (c) is a condensation product of the reaction between two mols of diethanolamine acid and one mol of coconut acid.

20. The method of claim 5 wherein the surface active agent added to the mixture of step (b) in step (c) is a non-ionic compound formed by the addition of ethylene oxide to a linear alcohol having a carbon chain length of about $C_{11}$ to about $C_{15}$.

21. The method of claim 5 wherein the surface active agent added to the mixture of step (b) in step (c) is a quaternary ammonium salt.

22. An improved method for separating kish graphite from fume in kish graphite-fume mixtures, wherein said kish graphite-fume mixtures are separated by screening on a 50 size screen to form a screen overflow consisting essentially of kish graphite and fume adhering to the surfaces of said kish graphite, and a screen underflow consisting essentially of fume and said screen overflow is mixed with at least one washing agent taken from the group consisting of water, hydrochloric acid, waste hydrochloric acid pickle liquor and mixtures thereof, the improvement comprising:
   a. adding about 20 parts per million to 50,000 parts per million of at least one surface active agent taken from the group consisting of a water soluble non-ionic compound which is a condensation product of the reaction between two mols of diethanolamine and one mol of at least one fatty acid taken from the group consisting of lauric acid, myristic acid, myristicoleic acid, palmitoleic acid, and coconut acids, a compound formed by the addition of ethylene oxide to a linear alcohol having a carbon chain of $C_{11}$ to $C_{15}$ and a quaternary ammonium salt to the mixture of the screen overflow and washing agent,
   b. agitating the mixtures formed in step (a) for a time at a temperature to completely wet the surfaces of kish graphite,
   c. filtering the mixture of step (b) on a 50 mesh screen to separate the kish graphite as a filter cake from the fume and washing agent and surface active agent as an effluent, said effluent being passed to waste, and
   d. washing and drying the kish graphite.

* * * * *